Aug. 10, 1943.  S. T. MORELAND ET AL  2,326,382
MOTOR CONTROL
Filed Oct. 25, 1940  4 Sheets-Sheet 1

S. T. Moreland
P. C. Tracy
INVENTORS

BY Rule & Hoge
ATTORNEYS

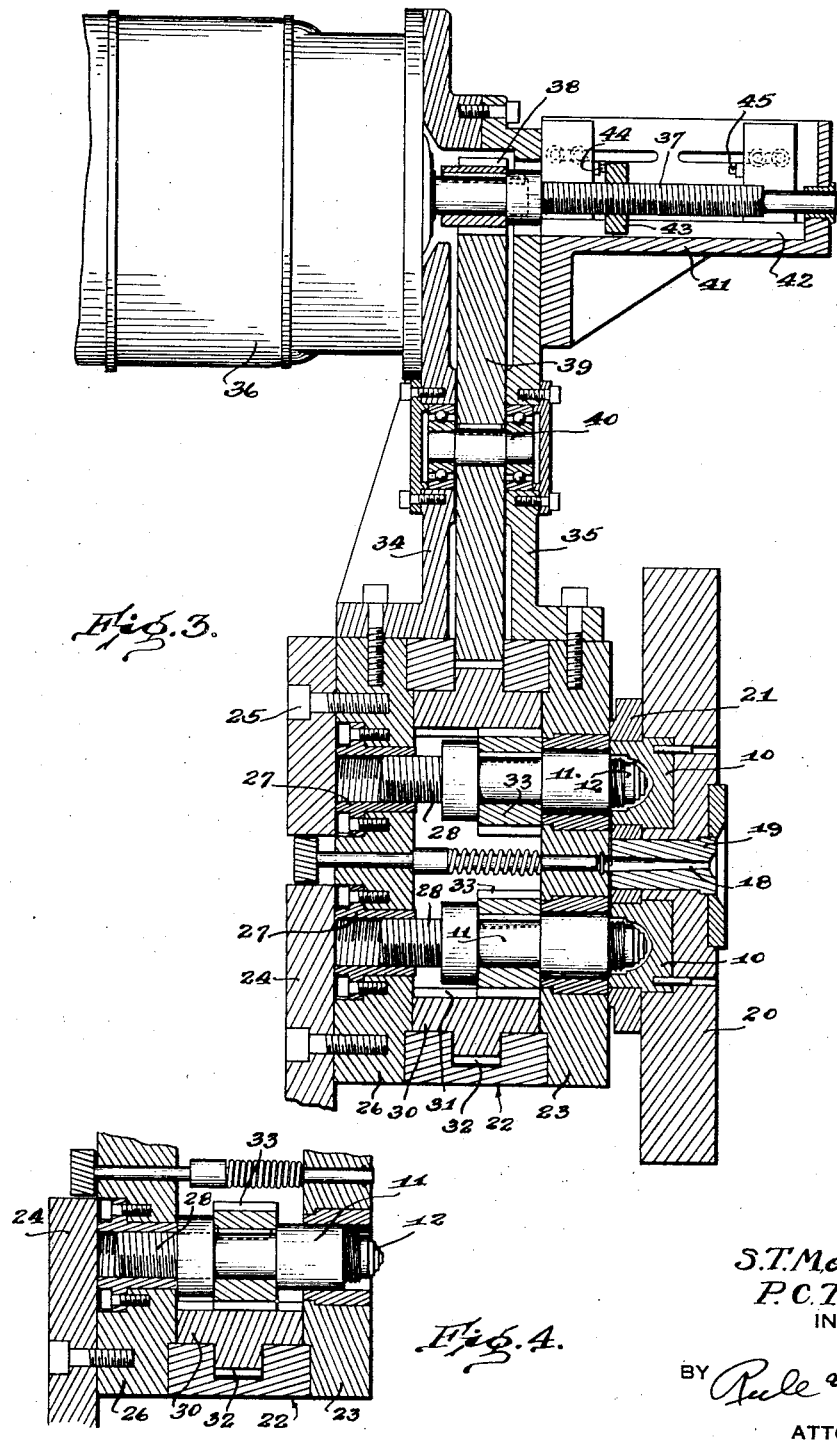

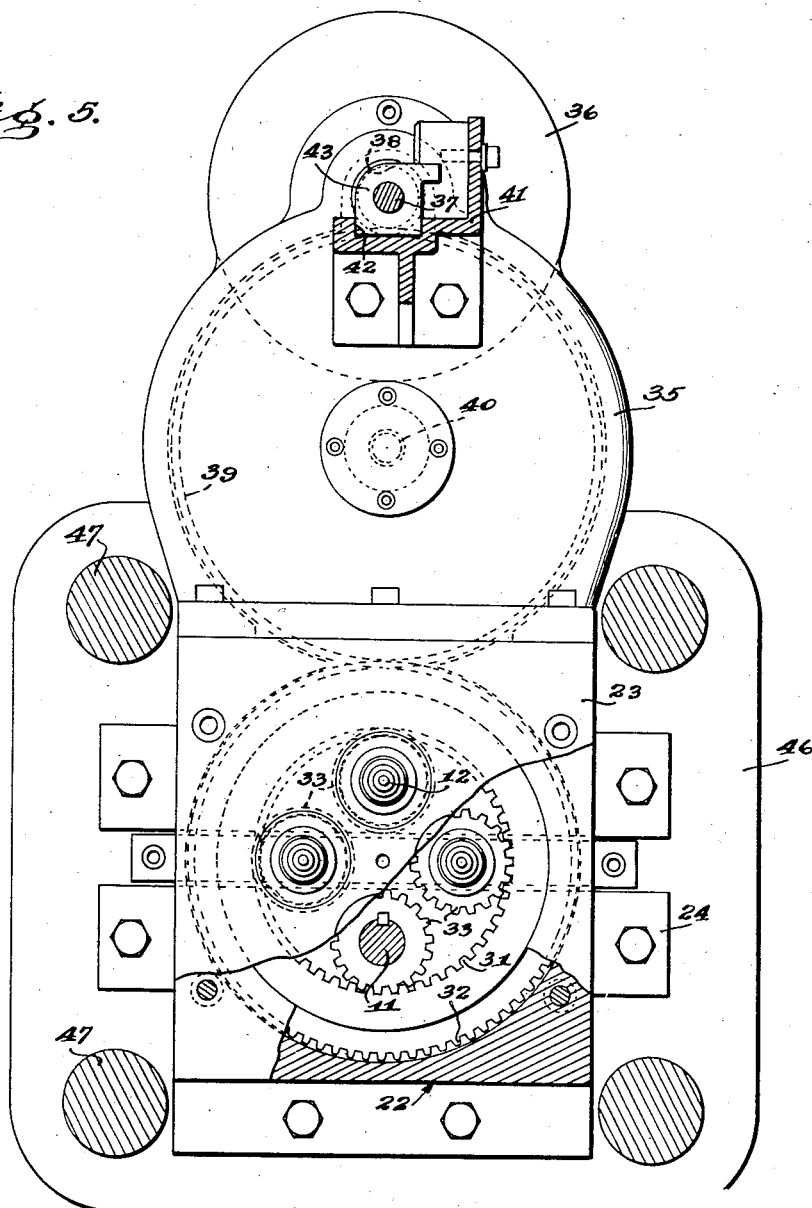

Patented Aug. 10, 1943

2,326,382

UNITED STATES PATENT OFFICE 2,326,382

MOTOR CONTROL

Stephen T. Moreland and Parker C. Tracy, Toledo, Ohio, assignors to Owens-Illinois Glass Company, a corporation of Ohio Application October 25, 1940, Serial No. 362,812

6 Claims. (Cl. 172—239)

Our invention relates to machines for molding organic plastic materials including thermoplastic and thermosetting materials, and more particularly to machines for molding bottle caps or the like provided with internal screw threads.

An object of our invention is to provide a machine of the above character embodying novel means for accurately forming the internal threads in a molded cap.

A further object of our invention as related to machines of the character above described is to provide a novel combination of a motor driven element as, for example, a die member, and driving and control means by which the motor may advance such element to a predetermined position and then hold it in said position by a reduced torque applied to said element by the motor after the said element has been brought to rest in such position.

The invention in its preferred form comprises molds or female dies in which the material is molded and screw-threaded plugs or die members having operating connections with an electric motor by which they are threaded into position within the molds, means for stopping the motor as the plugs approach their final position within the dies, means for maintaining an operating current through the motor with a reduced torque for holding the plugs in position while the molded material is setting and hardening, and automatic means for unthreading and withdrawing the plugs from the dies.

Other objects and novel features of the invention will appear hereinafter.

Referring to the accompanying drawings which illustrate a preferred embodiment of our invention:

Fig. 3 is a fragmentary sectional elevation on a larger scale showing particularly the dies, screw-threaded plugs and operating means therefor.

Fig. 4 is a fragmentary sectional view showing one of the plugs in its retracted position.

Fig. 5 is a part-sectional end elevation of mechanism illustrated in Fig. 3.

The machine as herein shown is adapted for molding bottle caps of thermoplastic material in molds or dies 10 (Fig. 3). Cooperating plugs 11 having screw threads 12 are provided for molding the interiors of the caps and forming internal screw threads therein.

Figure 1:
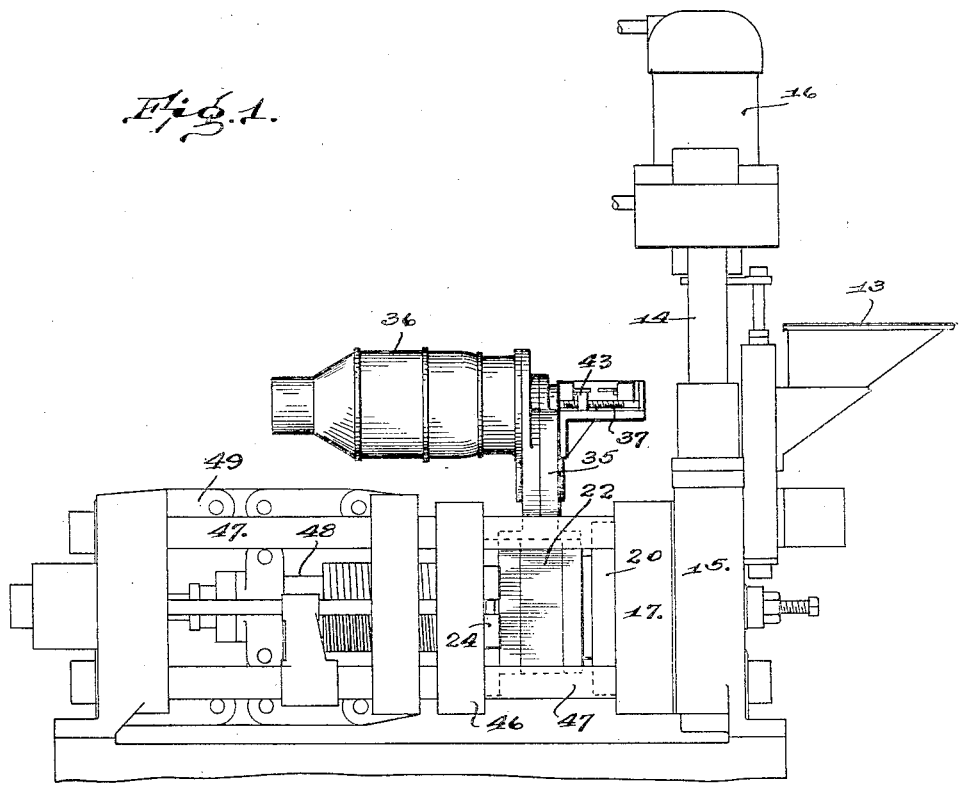
Fig. 1 is a partly diagrammatic elevation of the machine.
Figure 2:
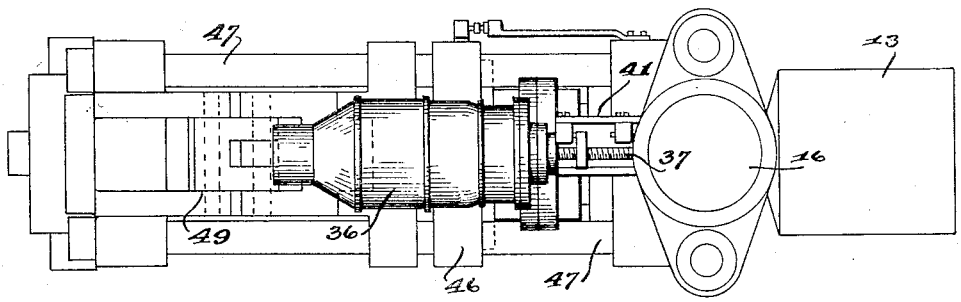
Fig. 2 is a plan view of the machine.

The machine as illustrated in Figs. 1 and 2 is in the main of conventional construction except as to the parts particularly illustrated in Fig. 3, including the dies and their operating mechanism. Such a machine is illustrated in the patent to Moreland et al., No. 2,298,716, October 13, 1942, for molding machines.

The machine comprises a supply hopper 13 to which the molding material may be fed in granular form. The material is fed in measured quantities from the hopper to injection mechanism including a vertically reciprocating plunger 14 by which individual charges of the material are fed into a heating chamber 15 wherein the material is heated and converted to a plastic condition. The plunger 14 is actuated by a hydraulic motor 16 which forces the material through the heating chamber and through a passageway extending through a bolster plate 17 and through a nozzle to a passageway 18 (Fig. 3) formed in a bushing 19 mounted in a die plate 20. The dies 10 or molds are removably mounted in the die plate 20 and held in position by a face plate 21.

The screw plugs 11 are mounted for rotation in a gear casing 22 comprising front and rear plates 23 and 24 respectively. The front plate 23 is provided with bushings in which the plugs 11 are journalled for rotation. The rear plate 24 has attached to its inner face by means of bolts 25 a plate 26 in which are mounted bushings 27 formed with internal screw threads, preferably of the same diameter and same pitch as the molding threads 12 on the forward ends of the plugs. The latter are formed with screw threads 28 running in the screw threaded bushings. Journalled within the gear casing 22 is a ring gear 30 formed with internal gear teeth 31 and external gear teeth 32. The plugs 11 have keyed thereon gear pinions 33 which run in mesh with the internal gear teeth 31.

Figure 6:
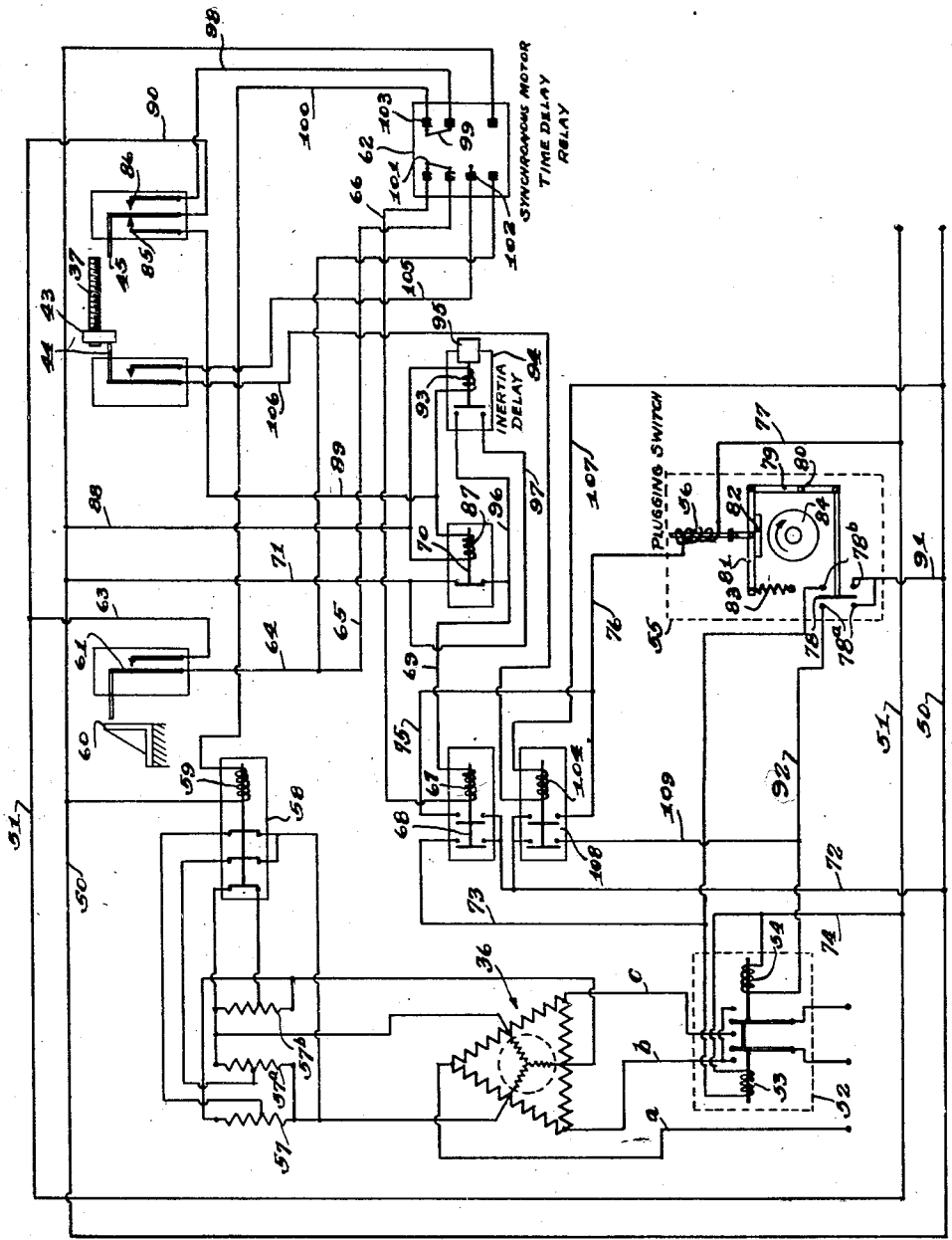
Fig. 6 is a wiring diagram of the electrical apparatus.

The gear case 22 is extended upwardly by means of a pair of parallel plates 34 and 35 bolted respectively to the plates 26 and 23. Mounted on the plate 34 is an electric motor 36. The drive shaft 37 of the motor has keyed thereto a gear pinion 38 which runs in mesh with a gear 39 keyed to a shaft 40 running on ball bearings in the plates 34 and 35. The gear 39 runs in mesh with the external gear teeth 32 of the ring gear 30. The forward end of the motor shaft is journalled in a bracket 41 mounted on the plate 35, said bracket formed with a guideway 42 in which travels a contact block 43 threaded on the shaft 37. The block 43 is adapted to enage switch arms or switch operating members 44 and 45 respectively (Figs. 3 and 6) as the contact block reaches opposite ends of its path of travel lengthwise of the motor shaft.

When the motor is rotated in one direction it operates through the train of gears above described to rotate the molding plugs 11 so that they move forward and are threaded into the dies 10 as shown in Fig. 3. When the motor is reversed the plugs are withdrawn to the Fig. 4 position. Such operation of the motor takes place while the plate 23 is held against the face plate 21 in the manner presently to be described. As shown in Fig. 5 there are four molding plugs 11 symmetrically arranged within the ring gear.

The gear casing 22 and gearing together with the motor 36 are mounted on the framework of the machine for horizontal reciprocating movement toward and from the stationary platen 20 and for this purpose may be connected to a bolster plate 46, mounted to reciprocate on horizontal tie bars 47 (Figs. 1 and 5) forming a part of the framework of the machine. The bolster plate 46 and parts carried therewith are reciprocated by a hydraulic motor 48 operating in a conventional manner through connections including toggles 49. The plate 23 (Fig. 3) is firmly held against the face plate 21 during the molding operations. The plastic material is introduced under high pressure through the passageway 18 and is distributed through lateral passageways into the mold cavities. This mold charging operation takes place while the molds are closed as shown in Fig. 3 with the plugs 11 at the limit of their forward movement, namely, in molding position.

Referring to the diagram (Fig. 6) the motor 36 is preferably a three-phase induction motor having a wound rotor. Electric current is supplied to the motor through the leads $a$, $b$ and $c$ connected to power mains. The various electrical control devices are supplied by the current from a separate source of supply to which they are connected through the main line wires 50 and 51. The direction of rotation of the motor is controlled by a reversing switch 52 actuated by electromagnet coils 53 and 54 under the control of a plugging switch 55 which is operable to stop the motor as hereinafter described, said switch comprising a solenoid 56. Resistances 57, 57ª and 57ᵇ in the rotor circuit of the motor are controlled by a triple-pole switch 58 which is adapted to be opened by a solenoid 59 when the latter is energized. When the switch is closed the resistances are cut out of circuit, allowing the motor to run with full torque. The switch is opened while the molding plugs are in the Fig. 3 position for maintaining a reduced torque while the motor is stalled.

The diagram (Fig. 6) shows the various switches and contactors in the position assumed at the beginning of the cycle of operations, namely, with the mold platens separated and the force plugs 11 in their retracted or unthreaded position. When the platen 23 is moved up to mold closing position (Fig. 3) the contact plate 60 (Fig. 6) closes a switch 61. This operates to energize a time delay relay 62 by establishing a circuit therethrough which may be traced from the main 51 through conductor 63, switch 61, wires 64, 65, relay 62, wire 66, solenoid 67 of a switch 68, wire 69, switch 70 and wire 71 to main 50. The solenoid 67 being thus energized closes the switch 68 and thereby establishes a circuit through the reversing switch coil 53, which circuit may be traced from the main 50 through wire 72, switch 68, wire 73, coil 53 and wire 74 to main 51. The reversing switch is thus operated to start the motor 36 in a direction to move the molding plugs forward to a molding position (Fig. 3).

The switch 68 when closed as above noted also makes a circuit through the coil 56 of the plugging switch. This circuit may be traced from the main 50 through wire 72, switch 68, wires 75 and 76, switch coil 56 and wire 77 to main 51. The plugging switch, which may be of conventional construction, comprises a contact bar 78 movable in one direction to bridge a pair of contacts 78ª and in the opposite direction to bridge contacts 78ᵇ. The contact bar 78 has a stem connected to one end of a lever 79 fulcrumed at 80, the other end of the lever being pivotally connected to an arm 81. A friction pad 82 carried by the arm 81 is movable downward by means of a coil spring 83 into engagement with a friction wheel 84 which may be mounted on the motor shaft. The arm 81 is connected to the armature of magnet coil 56 and is lifted when the coil is energized.

The circuit of the coil 56 being established by closing of the switch 68 as above noted, the friction pad 82 is lifted, leaving the motor free to run. The motor running in a forward direction advances the molding plugs and also causes the contact block 43 to travel from the Fig. 6 position toward the switch 45. This movement of the contact 43 permits the switch 44 to close but with no immediate result as the circuit for this switch is open at the time delay relay 62. Just before the molding plugs reach their final forward position the contact block 43 engages the switch 45 and shifts it from contact 85 to contact 86. This breaks the circuit through the solenoid 87 of switch 70, which circuit extends from the main 50 through wire 88, solenoid 87, wire 89, switch 45 and wire 90 to main 51. The solenoid 87 being deenergized, the switch 70 is opened, breaking the circuit through solenoid 67 so that switch 68 is opened. This breaks the circuit through the reversing switch coil 53 so that the reversing switch is opened and cuts off current from the motor.

The opening of the switch 68 also breaks the circuit through the coil 56 of the plugging switch. This permits the spring 83 to pull the friction pad 82 into contact with the friction wheel 84 and operates as a brake on the motor. The rotation of the friction wheel operating through the pad 82 swings the lever 79 about its fulcrum, thereby causing the contact member 78 to bridge the contacts 78ᵉ. This completes a circuit through the reversing switch coil 54, which circuit may be traced from main wire 50 through wire 91, switch contacts 78ª, wire 92, coil 54 and wire 74. The reversing switch is thus operated to reverse the motor circuits, reversing the torque on the motor so that it is quickly brought to rest.

The operation of the switch 45, which, as above noted, effects the opening of the reversing switch and stopping of the motor, also establishes a circuit for the solenoid 93 of an inertia delay switch 94, which solenoid 93 is connected in parallel with the coil 87. The solenoid 93 being energized, closes the inertia delay switch 94. Closing of this switch, however, is delayed for a short time by the action of a dash pot 95. This delayed closing of the switch is so timed that the switch is closed at the instant the motor is brought to rest. This closing of the delay switch 94 establishes a circuit for the switch coil 67, as said switch 94 is connected by means of wires 96 and 97 in parallel with the switch 70. The coil 67 being thus energized, closes the switch 68, again establishing a circuit through the reversing switch coil 53, and operates the reversing switch for supplying current to again drive the motor in a forward direction.

The motor, upon thus starting the second time, completes the forward movement of the molding plugs 11 to their final or molding position so that the motor is stalled but maintains a driving pressure on the force plugs. The torque of the motor, however, is reduced at the time the motor is started for the final movement, because the switch 45 closes a circuit for the solenoid 59 and operates the latter to open the switch 58 and introduce the resistances 57, 57a and 57b to the motor circuit. This circuit for the coil 59 may be traced from the main 51 through wire 90, contact 86, wire 98, contact arm 99 of time delay relay, wire 100 and coil 59 to main 50.

While the motor is stalled, holding the plugs in position the injection of the molding material takes place. After a certain length of time required to complete cooling and setting of the molded material, the molded article is ready for removal from the mold. The time cycle initiated by the closing operation of the switch 61 is adjusted so that the cycle is completed just at the time the molded pieces are ready for removal from the molds. The time delay relay, which is of conventional construction, operates at the completion of the cycle to swing a contact arm 101 downward from the position shown (Fig. 6) to engage a contact 102 and also to swing the arm 99 downward and break the circuit at contact 103. The opening of the circuit at contact 103 deenergizes the relay 59 so that the switch 58 is closed and cuts the resistance out of the rotor circuit so that the full torque of the motor is available for unscrewing the plug 11 from the molded pieces.

When the contact arm 101 is swung downward to engage the contact 102, a circuit is completed through a relay coil 104 controlling the reversing switch coil 54. This circuit can be traced from the main 51 through wire 63, switch 61, wires 64, 65, contact arm 101, contact 102, wire 105. switch 44, wire 106, coil 104, wire 107 to main 50. The coil 104 being energized closes relay switch 108, thereby establishing a circuit for the reversing switch coil 54, which circuit may be traced from main 50 through wire 72, switch 108, wire 109, coil 54 and wire 74. The reversing switch is thus operated in a direction to reverse the motor and withdraw the plugs. Operation of the relay switch 108 as just described also establishes a circuit through the plugging switch coil 56. At the completion of the reverse movement, namely, when the contact block 43 on the motor shaft completes its return and operates the switch 44 to open the circuit through relay coil 104 controlling the reversing switch, the latter is opened and the motor quickly brought to rest. This completes a cycle, leaving the parts in the position shown ready for a succeeding operation after the molded articles have been removed from the molds.

Modifications may be resorted to within the spirit and scope of the appended claims.

We claim:

1. The combination of an element mounted for rotation about an axis, guiding means for advancing said element in the direction of said axis as it rotates, an electric motor, driving connections between the motor and said element, automatic controlling means for the motor operable to connect it with a source of power and cause it to rotate said element, means for cutting off the current supply to the motor and stopping the motor and said element when the latter reaches a predetermined position, and means for again supplying current to the motor and maintaining a reduced driving torque on the motor after it has stopped and thereby causing it to maintain a reduced torque on said element for holding it in said predetermined position.

2. The combination of an electric motor, an element movable to and from a predetermined stop position, mechanism providing driving connections between the motor and said element, screw-threaded means for guiding and controlling the movement of said element as the latter is driven by the motor, automatic means for stopping the motor and said element as the latter nears said stop position, automatic means for then starting the motor under reduced torque and completing the movement of said element to the stop position, means for then stopping the motor and said element, and means for maintaining a driving force under said reduced torque on said element while the latter is at rest in said stop position.

3. The combination of an electric motor, an element movable to and from a predetermined stop position, mechanism providing driving connections between the motor and said element, screw-threaded means for guiding and controlling the movement of said element as the latter is driven by the motor, a reversing switch for the motor, means for automatically operating the reversing switch when said element nears its said stop position and thereby reversing the electrical driving force applied to the motor and bringing the motor to rest, and automatic means for reversing the switch when the motor is brought to rest and thereby again starting the motor in a forward direction and completing the forward movement of said element to said stop position.

4. The combination of an electric motor, an element movable to and from a predetermined stop position, mechanism providing driving connections between the motor and said element, screw-threaded means for guiding and controlling the movement of said element as the latter is driven by the motor, a reversing switch for the motor, means for automatically operating the reversing switch when said element nears its said stop position and thereby reversing the electrical driving force applied to the motor and bringing the motor to rest, automatic means for reversing the switch when the motor is brought to rest and thereby again starting the motor in a forward direction and completing the forward movement of said element to said stop position, and automatic means for introducing impedance into the motor circuit and thereby reducing the torque of the motor during the final movement of said element to said stop position.

5. The combination of an electric motor, a screw-threaded element, mechanism providing driving connections between the motor and said element for rotating the latter, screw-threaded guiding means for guiding said element and causing it to advance lengthwise in a forward direction to a predetermined stop position when said element is rotated in one direction and for withdrawing said element when rotated in the reverse direction, electrical control mechanism for automatically controlling the motor including means for causing it to rotate said element in a forward direction, means for stopping the motor and said element as the latter approaches said stop position, means for then starting the motor under a reduced torque and completing the forward movement of said element and holding it at rest in said stop position by the reduced torque on the motor after the motor has stopped, means for reversing the motor connections at a predetermined time limit after said element reaches said stop position and thereby causing the motor to withdraw said element, and means for opening the motor circuit when said element has been withdrawn and thereby stopping the motor.

6. The combination of an electric motor, an element movable to and from a predetermined stop position, mechanism providing driving connections between the motor and said element, screw-threaded means for guiding and controlling the movement of said element as the latter is driven by the motor, a reversing switch for the motor, means for automatically operating the reversing switch when said element nears its said stop position and thereby reversing the electrical driving force applied to the motor and bringing the motor to rest, automatic means for reversing the switch when the motor is brought to rest and thereby again starting the motor in a forward direction and completing the forward movement of said element to said stop position, automatic means for introducing impedance into the motor circuit and thereby reducing the torque of the motor during the final movement of said element to said stop position, and means for stopping the motor and said element with the latter in said stop position and maintaining a reduced driving torque on the motor after it has stopped and thereby causing it to maintain a reduced torque on said element for holding the latter in said stop position.

STEPHEN T. MORELAND.
PARKER C. TRACY.